United States Patent

Nickels

[15] 3,687,163
[45] Aug. 29, 1972

[54] SELECTOR VALVE WITH O-RING SEALS

[72] Inventor: William M. Nickels, Englewood, Colo.

[73] Assignee: C. A. Norgren Co., Littleton, Colo.

[22] Filed: Dec. 7, 1970

[21] Appl. No.: 95,822

[52] U.S. Cl. ...137/625.11, 137/625.41, 137/625.46, 251/314, 251/317
[51] Int. Cl. ............................F16k 11/00, F16k 5/04
[58] Field of Search.......137/625.11, 625.12, 625.15, 137/625.21, 625.31, 625.41, 625.46; 251/172, 314, 316, 317

[56] References Cited

UNITED STATES PATENTS

| 2,944,566 | 7/1960 | Modrin | 251/317 X |
| 3,584,831 | 6/1971 | Hafele | 251/172 |
| 3,246,667 | 4/1966 | Pemberton | 137/625.11 |
| 3,554,224 | 1/1971 | Kirk et al. | 137/625.11 |
| 3,570,314 | 3/1971 | Wagner | 137/625.11 |

FOREIGN PATENTS OR APPLICATIONS 535,424 4/1941 Great Britain........137/625.11

Primary Examiner—William R. Cline
Attorney—Sheridan, Ross & Burton

[57] ABSTRACT

Selector valve, principally for use in fluid systems, such as pneumatic or liquid, characterized by a stationary body member having an inner cylindrical surface and angularly spaced radial ports terminating thereat, a rotary valve member disposed therewithin having an outer cylindrical surface and a radial port terminating thereat, the surfaces providing an annular space therebetween of uniform radial width or thickness, a cage disposed in the annular space and fixed to one of the members, and angularly spaced O-rings in the cage adapted to seal against the two cylindrical surfaces. An annular space in the body member, sealed by concentric O-rings, communicates with the radial port in the rotary valve member, and resilient detents provide a releasable lock for selectively indexing the rotary valve member.

8 Claims, 5 Drawing Figures

PATENTED AUG 29 1972 3,687,163
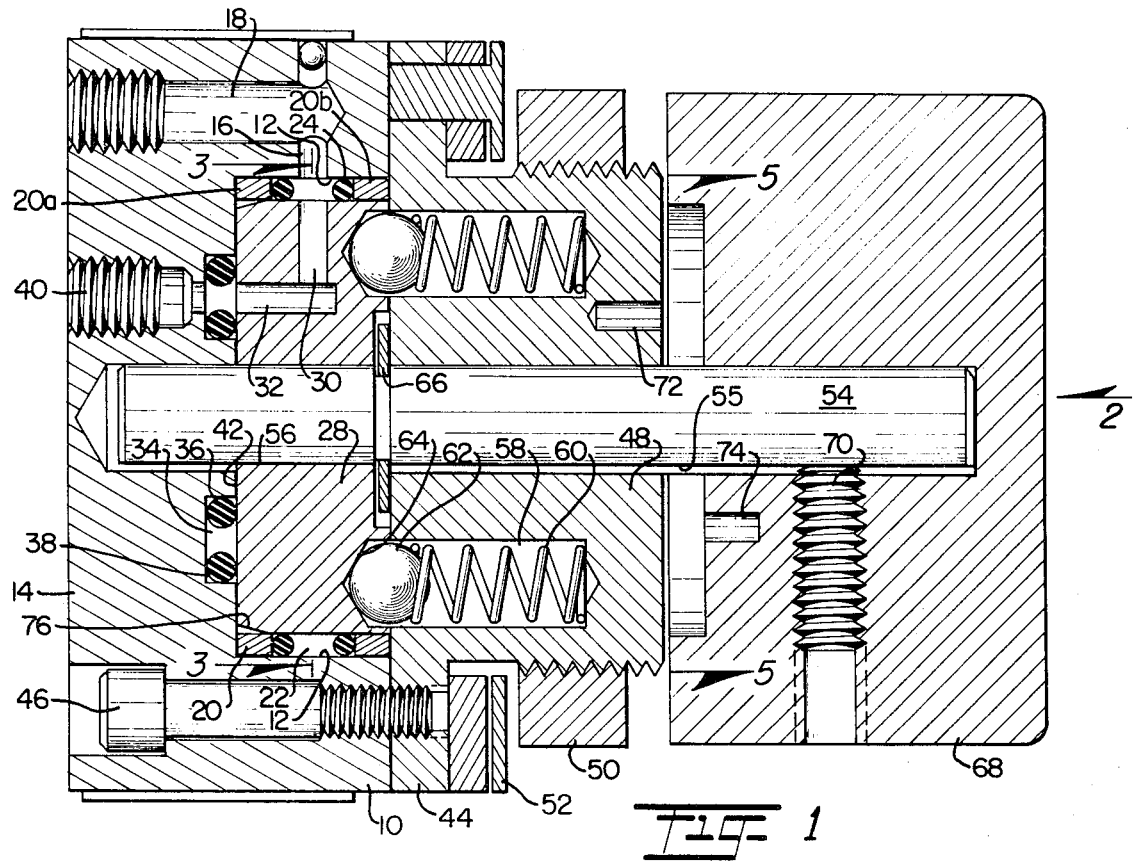
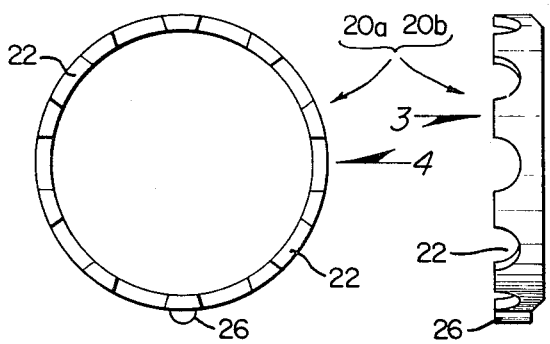
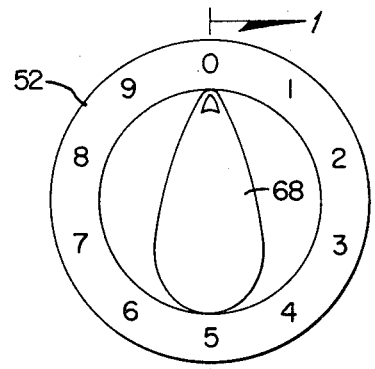
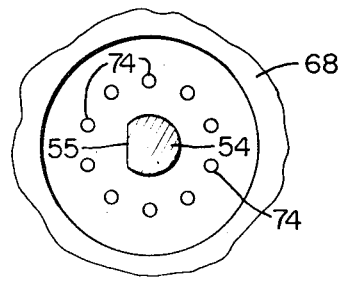
INVENTOR
WILLIAM M. NICKELS
BY Sheridan, Ross + Burton
ATTORNEYS

SELECTOR VALVE WITH O-RING SEALS

BACKGROUND OF THE INVENTION

Fluid technology involving gases or liquids and employed in industrial logic and control functions is a relatively new art which is rapidly developing and is superior in many cases to former cumbersome and complicated electronics systems employed for like purposes. By the use of components which provide signals responsive to pressure, an end control or sensing function may be attained which serves a like purpose to that attained with electronic circuitry. Thus, for example, such components as bus bars, resistors, capacitors, signal switches, and a myriad of others, have analogous counterparts in fluid circuitry in the respective forms of manifolds, controlled fluid flow passages, fluid volume chambers and fluid flow control valves. Since the actual volume flows of the fluid are seldom employed for directly operating devices to be ultimately controlled, but on the contrary, provides only signals for operating same by suitable power sources, the system may be extremely compact. Miniaturization of the various components is therefore the common trend, but this often presents serious manufacturing problems when a component, constructed to precise tolerances must be economically constructed at a competitive cost and which must meet the spatial requirements imposed thereon.

SUMMARY OF THE INVENTION

The present invention provides a miniature selector valve, principally for use in fluid systems, which is analogous to an electric selector switch employed in electric control circuitry. Its principal components comprise a stationary hollow body member having angularly spaced radial ports therein and a cylindrical rotary valve member disposed within the body member provided with a radial port which may be selectively positioned in alignment with a selected port in the body member. The inner surface of the body member and outer surface of the rotary valve member are provided with uninterrupted smooth cylindrical surfaces, providing an annular space therebetween of uniform thickness. O-rings are disposed within the annular space, one for each radial port, and are retained in desired position by an apertured cage affixed to the body member. Since the normal relaxed flat planes of opposite faces of the O-rings are thus distorted slightly to conform to the cylindrical surfaces, they are uniformly compressed in a radial direction at all points about their peripheries, thus providing identical sealing at all parts of same. The cage thus eliminates the considerable difficulty of either moulding or machining counterbores in the body member which would have truly cylindrical surfaces against which one side of an O-ring seats to similarly provide the uniform compression thereof as referred to. As will be apparent, the manner of compressing the O-rings differs from conventional practice wherein they are either laterally compressed between parallel planar surfaces or radially compressed with their sides remaining parallel planes. The basic parts so far referred to provide a functionally operative leak proof valve. However, refinements are also employed which include: A stationary annular channel in the body member, communicating with the port in the rotary valve member and sealed by concentric O-rings; resilient detents which lock the rotary valve member in proper angularly indexed positions; and optionally, removable stops which may be employed to limit movement of an operating knob between selected angular positions.

BRIEF DESCRIPTION OF THE DRAWING

FIG. 1 is an enlarged section taken on line 1—1, FIG. 2;

FIG. 2 is an end elevation as viewed in the direction of arrow 2, FIG. 1;

FIG. 3 is an elevation as viewed in the direction of arrow 3, FIG. 4;

FIG. 4 is an elevation as viewed in the direction of arrow 4, FIG. 3; and

FIG. 5 is a section taken on line 5—5, FIG. 1.

DESCRIPTION OF PREFERRED EMBODIMENTS

Referring now to the drawing, and first to FIG. 1, stationary body member 10 is provided with a smooth uninterrupted inner surface 12 of cylindrical shape, one end of the body member being closed by an integral end wall 14, the other end being open. A plurality of equi-angularly spaced radial ports 16 are disposed in the body member, their inner ends terminating at the inner surface referred to. These communicate with parallel ports 18 which threadedly receive suitable tubing fittings (not shown).

An O-ring cage 20 slidably fits within the cylindrical bore or surface of the body member and is provided with apertures 22, each of which contains an O-ring 24. The wall thickness of the cage is slightly less than the thickness of an O-ring. Preferably, the cage is constructed of identical halves 20a, 20b, one of which is best shown in FIGS. 3 and 4, which abut each other in a plane midway between opposite sides of the cage. An integral key 26 on each half slidably fits within a correspondingly shaped keyway in the body member which accurately locates the various O-rings concentric with the radial apertures 16 in the body and prevents rotary displacement from their aligned positions.

A rotary valve member 28 is disposed within the cage and O-rings 24 and is provided with a smooth cylindrical outer surface which clears the cage but slightly compresses O-rings 24 in a direction perpendicular to the parallel planes of their sides. Also, as will be apparent, since the O-rings are flat when relaxed they are distorted slightly so that the planes of the sides become cylindrical surfaces of the body and valve member. As will be further apparent, this results in uniform compression of the O-rings at all portions of their peripheries and in a direction perpendicular to the planes referred to. A radially extending port 30 communicates with another port 32 which may be either a supply or discharge port, depending upon the manner in which the valve is used.

The construction so far described comprises all of the basic elements of a leak-proof selector valve. It will be apparent, for example, that if a flexible conduit is connected to port 32 it may selectively deliver fluid to any one of radial ports 26 by suitably positioning the rotary valve member. Various refinements of the basic structure are desired, however, which will now be described.

Body member 10 is provided with an integral end wall 14 which is provided with an annular recess 34. A pair of concentric spaced O-rings 36, 38 are disposed within this recess, forming an annular space therebetween. A stationary port 40 in the body communicates with this space and one side of same is sealed by end face 42 of the valve member.

A closure 44 is secured by angularly spaced screws 46 to body 10, and forms a part of the stationary body construction. It has no sealing function, however, its principal purposes being to form a shaft bearing and means for mounting it to a panel (not shown) having a circular aperture therein. A threaded hub 48 extends through such aperture and a nut 50 engaging the hub clamps the entire valve to the panel. A numbered dial 52 is preferably also provided to enable an operator to select a desired indexed position of the rotary valve member. A shaft 54 having a flat 55 thereon is journaled in a central aperture in the hub, one end extending into a central aperture 56 in the rotary valve member. This aperture is preferably non-circular corresponding to the shaft which may thus rotate the rotary valve member. Closure 44 is provided with a pair of diametrically spaced blind holes 58, each of which is provided with a spring 60 and detent ball 62. An end face of the rotary valve member is provided with equi-angularly spaced depressions 64 into which the detent balls may move and provide a releasible lock, the depressions being of the same number as radial ports in the body member. To prevent inadvertent removal of the shaft, a snap ring 66 is disposed in a groove in same which forms a flange or shoulder disposed between one face of the rotary valve member and a face of the closure.

A knob 68 having a like non-circular aperture therein is carried by the outer end of the non-circular shaft 54 and is removably secured thereto by a set screw 70. The outer face of hub 48 is provided with a single hole 72. The knob is provided with a plurality of like holes 74 (FIG. 5) which are equi-angularly spaced in its inner face. Three identical roll pins are normally furnished with the valve for optional use. If the user desires that the knob be rotatable through more than a complete revolution, none of the pins are employed. If, however, the user desires to employ only a portion of ports 16, a pin such as a roll pin, is inserted in hole 72 and a pair of pins are inserted in desired holes 74 in the knob which thus provide limit stops at the ends of the sector or arc of holes selected.

While a ten position valve has been illustrated, it will be apparent that the number of positions may be varied as desired, two positions being the minimum to provide selectivity. The various ports in the body member may be connected to different fluid signal sources, some may be connected to the same signal source, some may be plugged, some may be vented to ambient air, or various combinations of the foregoing may be employed. The direction of flow is also optional since the single port in the rotary valve may be connected to a single signal source to selectively deliver such signal to a plurality of signal receiving sources; or the latter, which may be signal delivering sources may deliver same to the single port in the rotary valve member. To obviate maintaining extremely precise tolerances of concentricity between the actuating shaft support bearing and the periphery of the rotary valve member, the valve member is preferably provided with a slight amount of "float" so that it is journaled by the faces of the O-rings 24 surrounding same rather than by the shaft support bearing. With this float it becomes apparent that regardless of its indexed position it applies equal pressure to all of the O-rings within which it is rotatably journaled. The O-rings thus become the actual journal and the shaft merely becomes means for rotating the rotary valve therewithin. It will also be apparent that to obtain the ultimate effect of uniform compression of all O-rings with this floating effect there should be at least two equi-angularly disposed O-rings, but preferably three (120° apart) to equalize the radial outward forces on the O-rings. It will be further apparent, the floating effect and equalization of pressure on the O-rings may be attained by employment of angularly spaced dummy O-rings which serve no sealing function but merely center the valve in such manner to uniformly pressurize the outer surface of the rotary valve member against the inner faces of the O-rings which seal their respective ports. To facilitate assembly of valve member 28 into the previously assembled O-rings 24 and cage 20, the valve member is preferably provided with a chamfer 76 at one end thereof.

As illustrated in the drawing and so far described, cage 20 is keyed to body member 10 and O-rings 24 are thus stationary. As will be apparent, and contemplated within the purview of the invention, cage 20 may be keyed to rotary valve member 28 in which construction cage 20, O-rings 24, and valve member 28 rotate as a unit relative to stationary body member 10.

The wall thickness of the cage should be slightly less than the cross sectional thickness of O-rings 24 so that it serves as a floating retainer for locating O-rings 24 in desired alignment with the ports but does not prevent compression of O-rings 24 in the direction perpendicular to the planes of their opposite sides.

What is claimed is:
1. A selector valve, comprising;
   a. a stationary body member having a cavity therein with an inner annular surface,
   b. a plurality of angularly spaced ports in said body member, each having an end terminating at said inner surface,
   c. a rotatable valve member having an outer annular surface disposed within said cavity and being of a size to provide an annular space between its outer surface and said inner surface, said annular space being of substantially uniform width at all parts thereof,
   d. an annular O-ring retaining cage disposed in said annular space and fixedly secured to one of said members,
   e. a plurality of angularly spaced circular apertures in the wall of said cage,
   f. an O-ring in each circular aperture surrounding an end of a corresponding port in said body member,
   g. said valve member being of a size to distort the O-rings from a normally relaxed flat shape to a shape in which opposite faces thereof engage said outer and inner surfaces and are uniformly compressed therebetween at all peripheral portions thereof, and h. at least one outwardly extending port in said valve member adapted to be selectively positioned in alignment with the ports in the body member.

2. A valve in accordance with claim 1 wherein said cage is constructed of two identical halves which abut each other at a central plane between opposite ends of the cage.

3. A valve in accordance with claim 1 including at least one spring urged detent carried by the body member, and a plurality of angularly spaced detent engaging depressions in one end of the valve member, of a number equal to the number of ports in the body member, and so spaced to selectively lock the outwardly extending port in the valve member in alignment with the ports in the body member.

4. A valve in accordance with claim 1 including a wall closing one end of said cavity, an annular sealed space between one end of the valve member and the end wall, said outwardly extending port communicating with the annular sealed space in all rotary positions of the valve member, and a fixed port in the body member communicating with the annular sealed space.

5. A valve in accordance with claim 4 wherein said annular sealed space includes a pair of radially spaced concentric O-rings adapted to be compressed between the end wall and one end of the rotary valve member, and a spring urged detent engaging the other end of the rotary valve member for locking the valve member in selective positions with the outwardly extending port in alignment with the ports in the body member.

6. A valve in accordance with claim 1 including an end wall formed as an integral part of the body member and closing one end of said cavity, a removable closure forming a portion of the body member and closing the other end of the cavity, said closure including means for mounting the entire valve in a circular hole in a panel, a shaft affixed to the rotatable valve member for rotating same and rotatably supported by said closure, and an actuator, such as a knob, affixed to one end of the shaft for rotating the shaft and valve member.

7. A valve in accordance with claim 6 including an aperture in a face of the closure adapted to removably receive a fixed stop pin, a plurality of angularly spaced apertures in a face of the knob adapted to removably receive like stop pins, the number of apertures being equal to the number of apertures in the body member, the construction being such that a pair of pins may be selectively inserted in desired apertures in the knob member, and which are engagable with the fixed stop pin and limit rotation of the knob to a desired angular portion of a complete revolution thereof.

8. A valve in accordance with claim 6 wherein the rotatable valve member is affixed to the shaft, and a shoulder on the shaft, such as a snap ring, disposed adjacent an inner face of the closure for preventing inadvertent separation of the shaft and knob from the body member.

* * * * *